(12) United States Patent
McKenzie

(10) Patent No.: US 6,588,602 B1
(45) Date of Patent: Jul. 8, 2003

(54) SEALING GASKET ARRANGEMENT FOR SPIN-ON FILTER CARTRIDGES

(75) Inventor: Darrell T. McKenzie, Gastonia, NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/891,525

(22) Filed: Jun. 27, 2001

(51) Int. Cl.⁷ .............................................. B01D 27/08
(52) U.S. Cl. ............... 210/443; 210/450; 210/DIG. 17; 277/918
(58) Field of Search ................................. 210/440, 443, 210/444, 450, DIG. 17; 277/918

(56) References Cited

U.S. PATENT DOCUMENTS

| | | |
|---|---|---|
| 4,764,275 A | 8/1988 | Robichaud |
| 4,834,885 A | 5/1989 | Misgen et al. |
| 4,969,994 A | 11/1990 | Misgen et al. |
| 5,301,958 A * | 4/1994 | Covington .................. 210/450 |
| 5,902,478 A | 5/1999 | O'Ryan |

FOREIGN PATENT DOCUMENTS

SU            1466779 A  *  3/1989  ........... B01D/27/00

* cited by examiner

*Primary Examiner*—Matthew O. Savage
(74) *Attorney, Agent, or Firm*—Millen, White, Zelano & Branigan, P.C.

(57) ABSTRACT

A spin-on filter cartridge adapted to be mounted on a filter mount has a housing with an open end and a closed end. Adjacent to the closed end of the housing is a crimped portion defining an annular groove, the crimped portion retaining an annular support and having a radially extending shelf for supporting an end plate. An annular gasket having an annular channel for receiving the crimped portion of the housing has projecting rib which is received in the annular groove defined by the crimped portion. With this arrangement, the annular gasket is securely attached to the housing and is able to rotate independently of the housing, so that when the gasket is in abutment with the filter mount, the housing can be rotated without rotating the gasket.

12 Claims, 2 Drawing Sheets

SEALING GASKET ARRANGEMENT FOR SPIN-ON FILTER CARTRIDGES

FIELD OF THE INVENTION

This invention relates to sealing arrangements for spin-on filter cartridges. More particularly, the present invention relates to gaskets which seal the periphery of a spin-on filter cartridge with a filter mount on the device utilizing the cartridges.

BACKGROUND OF THE INVENTION

Spin-on filters are widely used in many applications, such as for example, lubrication systems for internal combustion engines used in vehicles, as well as having use in other systems such as, fuel systems, hydraulic systems and many other systems in which fluids are filtered. This is because spin-on filters are convenient to install and change. These filters have an annular filter element mounted within a housing which is closed at one end and open at the other end. The open end of the housing is closed with an end plate on which the filter is mounted, usually with some type of grommet or support. The end plate generally has a threaded central opening and a plurality of radially positioned, spaced-apart openings. The annular filter element is placed between the central opening and the radially positioned openings so that fluid flowing between the central and radial positioned openings must pass through the filter element.

Spin-on filters generally have an annular gasket adjacent to the end plate and in abutment with a cover which retains the end plate within the housing. Currently, the gaskets are L-shaped and occasionally have sealing problems. It is expensive to eliminate these sealing problems in attempts to maximize reliability. Accordingly, there is a need for sealing gaskets which minimize sealing problems and are therefore more reliable and less costly.

SUMMARY OF THE INVENTION

In view of the aforementioned considerations, the present invention is directed to a spin-on filter cartridge adapted to be mounted on a filter mount. The filter cartridge has a housing for containing a filter element therein which is received through an open end of the housing. An end plate within the housing closes the open end. Adjacent to the open end of the housing is a crimped portion thereof which defines an annular groove. An annular support cooperates with the crimped portion and supports the end plate on a radially extending shelf. An annular gasket, having an annular channel therein for receiving the crimped portion, also has a projecting annular rib which is received in the annular groove defined in the crimped portion of the housing. The annular gasket is rotatable with respect to the housing when effecting a seal with the filter mount.

In a more specific aspect, the annular gasket includes an annular channel therein which receives the crimped portion of the housing, and in still a more specific aspect of the invention, the annular gasket is configured as a body which has a first surface which is adapted to seal with the filter mount and a second surface which seals against the radially extending support shelf, which shelf cooperates with the crimped portion of the housing.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
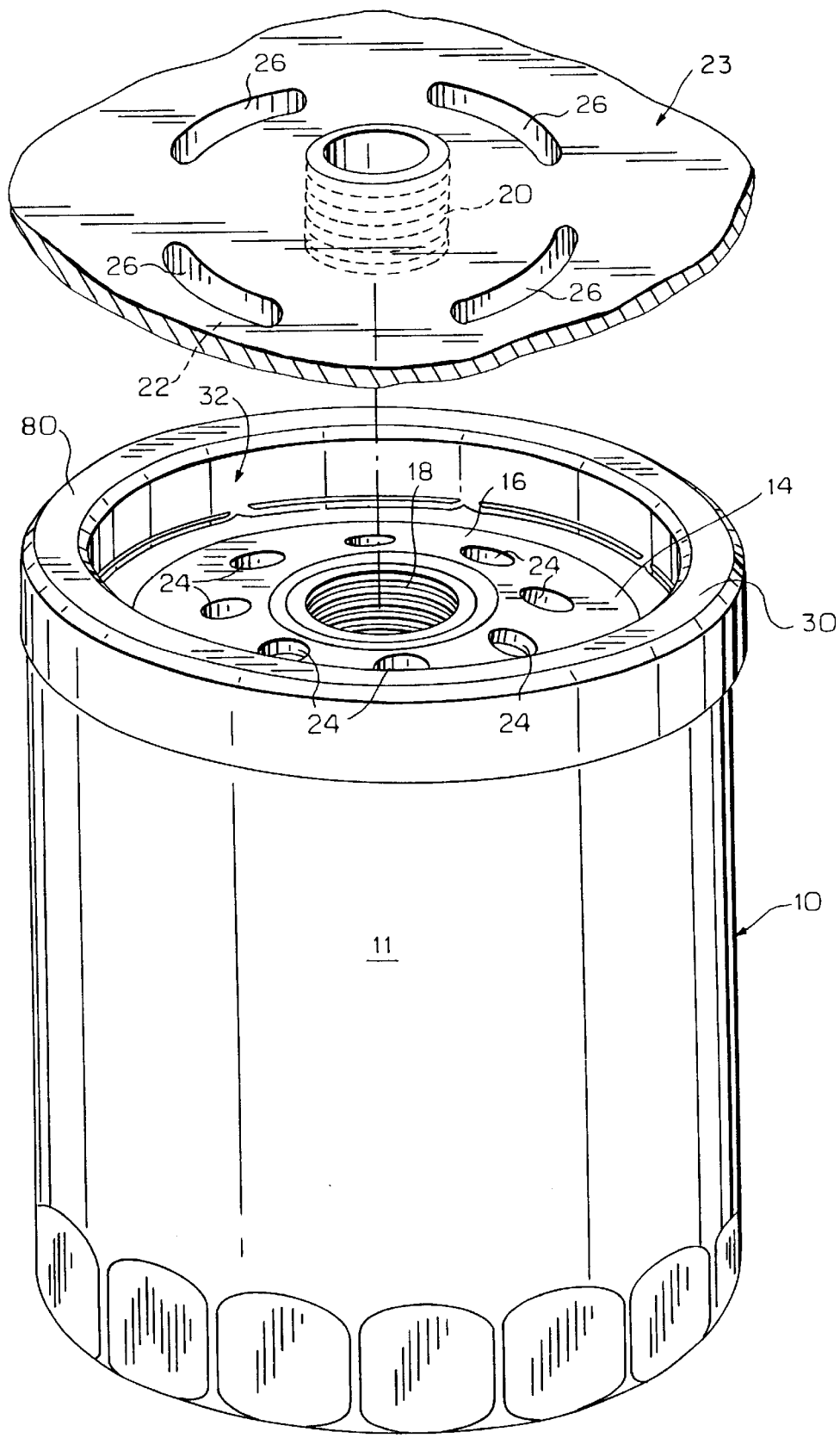
FIG. 1 is a perspective view of a spin-on filter cartridge configured in accordance with the principles of the present invention and aligned with a filter mount.

Referring now to FIG. 1, there is shown a spin-on filter cartridge 10 having a housing 11 which contains a filter element therein. The housing 10 has an open first end 14 which is closed by an end plate 16, the end plate 16 having a threaded central opening 18 which threads onto a stand pipe 20 projecting from a surface 22 of a filter mount 23. The filter mount 22 is part of a device, such as an internal combustion engine, a hydraulic machine, a fuel supply system, or any other system which employs the spin-on filter cartridge 10 to filter a fluid, which fluid may be a lubricant such as lubricating oil, hydraulic fluid, transmission fluid, fuel or air, as well as any other type of fluid. The end plate 16 has a plurality of spaced, radially positioned openings 24 which communicate with openings 26 through the filter mount 23. In order for fluid to pass from or to the threaded central opening 18 or to or from the spaced radially openings 24, it must first pass through the filter element 12.

In order to seal the spin-on filter cartridge to the surface 22 of the filter mount 23, an annular gasket 30 is positioned at the open end 14 of the housing 11, which open end is closed by the end plate 16. The gasket 30 projects beyond the open end 14 of the housing 11 to define an annular chamber 32 around the coupling between the threaded stand pipe 20 and the threaded central opening 18. Consequently, there is the fluid communication only between the radially spaced openings 24 through the end plate 16 and the openings 26 through the surface 22 of the filter mount 23.

Figure 2:
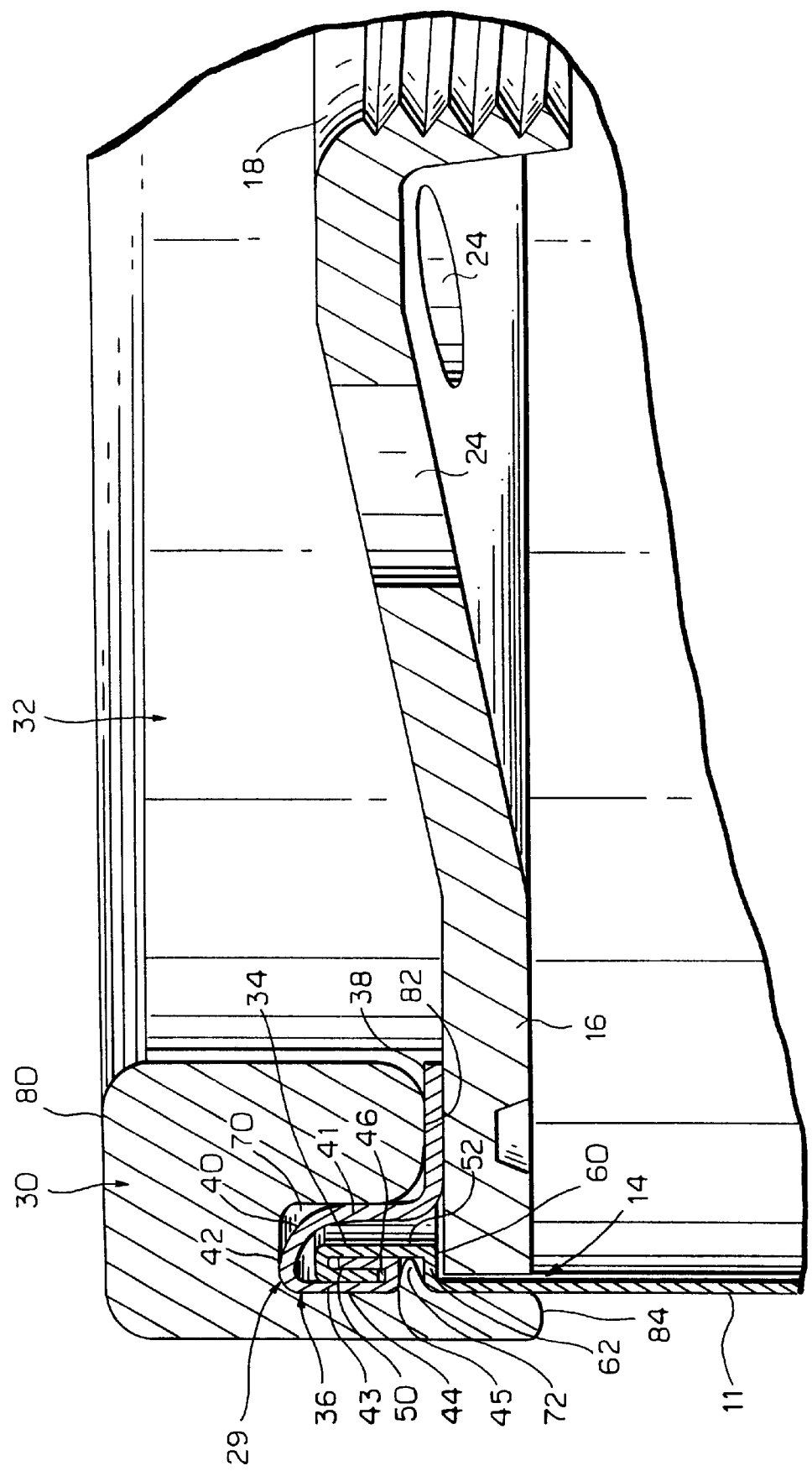
FIG. 2 is a side view partially in section of a portion of the filter cartridge of FIG. 1 showing cooperation between a filter gasket and a crimped end portion of the filter cartridge.

Referring now to FIG. 2 where a coupling 29 between the open end 14 of the housing 11 and the annular gasket 30 is shown, it is seen that the open end has a crimp 34 therearound, which crimp 34 retains an annular plate support 36. The annular plate support 36 has a shelf portion 38 upon which the plate 16 rests. The shelf support 38 is connected to the crimp 34 by a U-shaped portion 40 that has a first depending leg 41, a bight portion 42 and a second leg 43. The leg 43 has a depending lip 44 joined thereto by a second bight 45 so that a gap 46 occurs between the second leg 43 and the lip 44.

The gap 46 on the plate support 36 cooperates with the crimp 34 by receiving a lip 50 on the crimp 34 which projects back toward the housing 11. The lip 50 is spaced from an indented portioned 52 of the crimp 34 so that a gap in the crimp receives the lip 50 of the plate support 36, securely holding the plate support to the housing 11 adjacent the open end of 14 of the housing 11. A gap 60 is disposed between a bend 62 at the open end of the housing which is spaced from the bend 45, the crimp 34. Gap 60 provides an annular groove around the open end 14 of the housing 11 which is inboard of the crimp 34.

In order to secure the gasket 30 at the open end of the housing 14, the gasket 30 has an annular channel 70 which receives the crimp 34 and the U-shaped portion 42 of the plate support 34. The gasket 30 also has an inwardly projecting annular rib 72 which is received in the circular groove defined by the gap 60. The annular rib 72 keeps the gasket 30 from sliding axially away from the housing 11.

The gasket 30 is a resilient body made of material such as rubber or another resilient, flexible material. A first surface 80 on the gasket 30 engages surface 22 of filter support 23 (see FIG. 1) and a second surface 82 on the gasket engages the shelf portion 38 of plate support 36. Outer portion 84 of the gasket 30 projects beyond the second surface 82 in spaced relation thereto and engages the outer surface of the housing 11 adjacent the open end 14 thereof. The annular rib 72 projects inwardly from the outer portion 84 at approximately the level of the second surface 82 of the gasket 30.

By having the above-identified arrangement, the gasket 30 is rotatable with respect to the housing 11 of the spin-on cartridge 12 so that as the central opening 18 threaded onto the stand pipe 12, surface 80 combined with the surface 22 of the filter element mount 23 holds the gasket 30 stationary, while the spin-on filter rotates and compresses the gasket against the filter mount, thus providing a reliable seal.

The gasket 30 may be made of any of the materials used for spin-on filter gaskets. A preferred material may be, for example, nitrile rubber.

From the foregoing description, one skilled in the art can easily ascertain the essential characteristics of this invention, and without departing form the spirit and scope thereof, can make various changes and modifications of the invention to adapt it to various usages and conditions.

I claim:

1. A spin-on filter cartridge adapted to be mounted on a filter mount, the filter cartridge having a housing containing a filter element therein, an end plate within the housing which closes an open end of the housing and supports the filter element thereon, the cartridge comprising:

a crimped portion on the housing adjacent the open end of the housing, the crimped portion defining an annular groove;

an annular support crimped with the crimped portion supporting the end plate on an inwardly extending radial shelf portion of the annular support, and an annular gasket having an annular channel therein for receiving the crimped portion, the annular gasket having a projecting annular rib which is received in the annular groove defined in the crimped portion of the housing and the annular gasket being rotatable on the housing when effecting a seal with the filter mount on which the filter cartridge is mounted.

2. The spin-on filter cartridge of claim 1 wherein the gasket is made of nitrile rubber.

3. The spin-on filter cartridge of claim 1 wherein the annular support has an annular lip which is received in an annular slot formed by the crimp.

4. The spin-on filter of claim 3, wherein said annular lip of the annular support shelf projects from a U-shaped bend in the annular support.

5. The spin-on filter cartridge of claim 4 wherein the annular gasket comprises a resilient body having a first surface adapted to seal with the filter mount and a second surface facing away from the first surface and abutting the inwardly extending radial shelf portion.

6. The spin-on filter of claim 5 wherein the body comprising the gasket includes an outer portion around an outside surface of the housing and extending beyond the second surface in spaced relation thereto to define the annular channel which receives the crimped portion, the outer portion having the projecting annular rib thereon which is received in the annular groove.

7. The spin-on filter of claim 6 wherein the outer portion of the body extends around the housing adjacent the open end thereof.

8. The spin-on filter cartridge of claim 7 wherein the projecting annular rib is positioned at a distance from the first surface of the body which is substantially the same as the distance of the second surface of the body from the first surface thereof.

9. The spin-on filter cartridge of claim 1 wherein the annular gasket comprises a resilient body having a first surface adapted to seal with the filter mount and a second surface facing away from the surface and abutting the inwardly extending radial shelf portion of the annular support.

10. The spin-on filter of claim 9 wherein the body comprising the gasket includes an outer portion around an outside surface of the housing extending beyond the second surface in spaced relation thereto to define the annular channel which receives the crimped portion, the outer portion having the projecting annular rib thereon which is received in the annular groove.

11. The spin-on filter of claim 10 wherein the outer portion of the body extends around the housing adjacent the open end thereof.

12. The spin-on filter cartridge of claim 11 wherein the projecting annular rib is positioned at a distance from the first surface of the body which is substantially the same as the distance of the second surface of the body from the first surface thereof.

* * * * *

UNITED STATES PATENT AND TRADEMARK OFFICE
CERTIFICATE OF CORRECTION

PATENT NO. : 6,588,602 B1
DATED : July 8, 2003
INVENTOR(S) : McKenzie

It is certified that error appears in the above-identified patent and that said Letters Patent is hereby corrected as shown below:

Column 4,
Line 30, after "the", first occurrence, insert -- first --.

Signed and Sealed this

Third Day of May, 2005

JON W. DUDAS
*Director of the United States Patent and Trademark Office*